United States Patent [19]

Nakao

[11] 4,146,682

[45] Mar. 27, 1979

[54] BATTERY CASE HOLDING MECHANISM

[75] Inventor: Toshihiro Nakao, Hachioji, Japan

[73] Assignee: Olympus Optical Co., Ltd., Tokyo, Japan

[21] Appl. No.: 905,345

[22] Filed: May 12, 1978

[30] Foreign Application Priority Data

May 13, 1977 [JP] Japan .............................. 52-61218[U]

[51] Int. Cl.² ............................................. H01M 2/10
[52] U.S. Cl. ..................................... 429/97; 429/100
[58] Field of Search .................. 429/96, 97, 100, 123, 429/1, 9; 206/333, 804; 221/151, 152, 191; 354/80, 81; 58/23 BA, 53, 88 R

[56] References Cited

U.S. PATENT DOCUMENTS

| | | | |
|---|---|---|---|
| 2,007,320 | 7/1935 | Young | 429/1 |
| 2,397,469 | 4/1946 | Casanov | 429/1 |
| 3,181,974 | 5/1965 | Barbera | 429/100 |

*Primary Examiner*—Anthony Skapars

[57] ABSTRACT

A battery case holding mechanism comprising an engaging means for engaging a battery case which is detachably inserted into a concave formed in a body of an electric apparatus and is biased so as to be detached from the concave and disengagement preventing means which is actuated when the engaging means operates and engages temporarily the battery case in order to prevent the case from springing out of the concave.

6 Claims, 9 Drawing Figures

BATTERY CASE HOLDING MECHANISM

BACKGROUND OF THE INVENTION

This invention relates to a battery case holding mechanism which prevents, when the battery case is taken out of a concave formed in an electric apparatus, the battery case from springing out of the concave.

Generally, an electric apparatus such as a cassette tape recorder has a concave formed therein, and a battery case is detachably housed in the concave. In this case, the battery case is engaged and held in the concave by the engaging means, and is constructed so as to be sprung out by the bias force of a bias means such as a compression coil spring or a leaf spring, when it is released from the engagement by manual operation.

The conventional battery case holding mechanism has a disadvantage that the battery case can not be taken out thereof without failure with the weak bias force of a bias means, and yet it is forcibly sprung out at the moment when released from the engagement with the overstrong bias force of the bias means, and falls at once. On the other hand, even in the event of the bias force being not overstrong, it is feared that the battery case falls when released from the engagement with the concave remaining placed upside down.

SUMMARY OF THE INVENTION

It is an object of this invention to provide a battery case holding mechanism which capable of ensuring the battery case to be taken out and also preventing if with certainty from occurrence of an accident of falling.

To achieve this object, the battery case holding mechanism according to this invention comprises a disengagement preventing means adapted to actuate interlockingly with the engagement releasing operation of the engaging means which engages the battery case received detachably within the concave. The disengagement preventing means operates in order that the battery case released from the engaging means comes into contact with the disengagement preventing means to be temporarily held in engagement therewith. Accordingly, the battery case is held in the concave and prevented from springing out of it, even when the engaging means is released. Thereafter, the battery case is ready to be taken out by releasing the engagement between the disengagement preventing means and the battery case.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
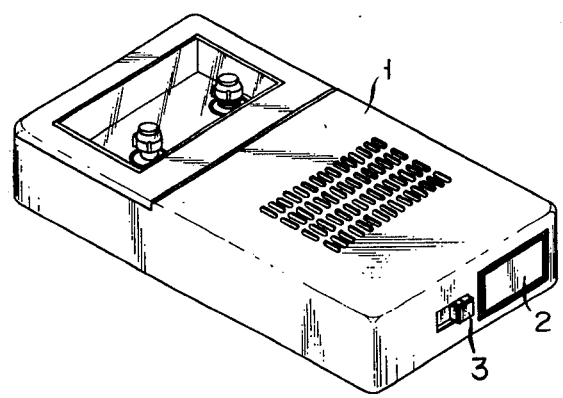
FIG. 1 is a schematic perspective view of a cassette tape recorder equipped with a battery case holding mechanism according to this invention.

FIG. 1 illustrates an appearance of a cassette tape recorder, where reference numeral 1 denotes a main body of the apparatus, reference numeral 2 denotes a battery case detachably mounted on the main body, and reference numeral 3 denotes an engaging member mounted movably forward and rearward on the main body of the apparatus.

Figure 2:
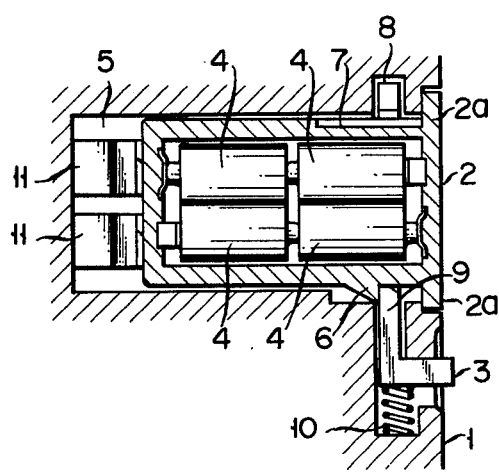
FIG. 2 is a transverse cross sectional view of a first embodiment of the mechanism of the invention which is equipped with cassette tape recorder, where the battery case is located at the engagement position.

The battery case 2 has, as shown in FIG. 2, flanges 2a on its both sides and receives four pieces of batteries 4 left connected in series therein, and further is demountably housed within a concave 5 for the battery case, which is formed in the main body of the apparatus. This battery case 2 has a projected engaging portion on one side and on the other side a groove which extends in the direction in which the case is inserted and taken out.

Figure 3:
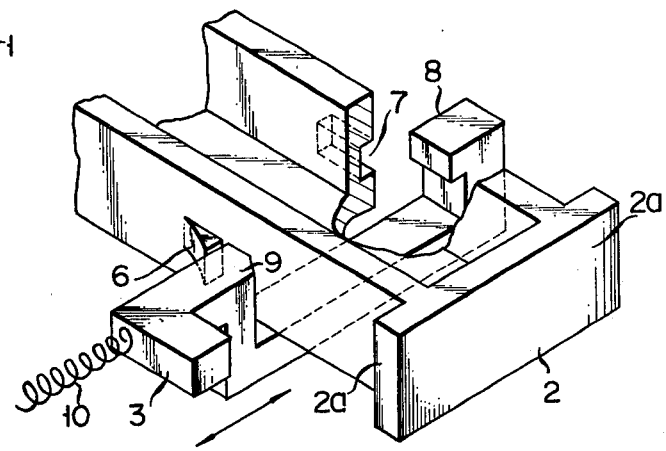
FIG. 3 is a partially broken perspective view of the first embodiment.

The engaging member 3 at its one end, as shown in FIG. 3, is projected outside the main body 1 and at the other end, extended to the opposite side of the battery case 2 along the bottom surface of the battery case 2, and further, the other end is bent into a hook-shape to make a disengagement preventing portion 8. In addition, the enagaging member 3 has an engaging portion 9 in the middle and is mounted movably forward and rearward in the direction perpendicular to that in which the battery case is demountably inserted. The engaging member 3 is urged by means of a compression coil spring 10 in one direction under the normal condition and permits its engaging portion 9 to be engaged with a projected engaging portion 6 of the battery case 2, thereby holding the battery case 2 within the concave 5. Where the engaging member 3 is moved against the bias force of the spring 10, the engaging portion 9 is disengaged from the projected engaging portion 6 and the disengagement preventing portion 8 comes into the groove 7 at almost the same time.

A bias means 11 such as a leaf spring, for example, which urges outwardly the battery case 2 is equipped within the concave 5.

Figure 4:
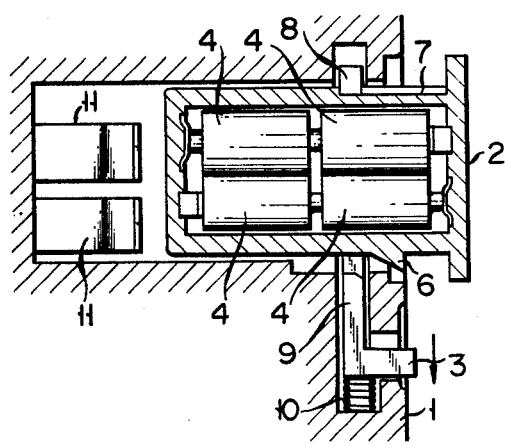
FIG. 4 is a transverse cross sectional view similar to FIG. 2, where the battery case is at a position on its way of disengagement.

Hereupon, where the engaging member 3 is shifted against the bias force of the spring 10 with the battery case 2 remaining housed in the concave 5, as shown in FIG. 1, the engaging portion 9 is disengaged from the projected engaging portion 6 and at the same time the disengagement preventing portion 8 comes into the groove 7, as mentioned above. With the disengagement of the engaging portion 9 from the projected engaging portion 6, the battery case 2 is released from the condition in which it is engaged, and then it may be sprung out by the bias force of the leaf spring 11. Since, however, the disengagement preventing portion 8 is inserted into the groove 7 at the same time, the battery case 2 is temporarily engaged and held at a position on its way of disengagement under the condition in which a terminal end of the groove 7 is in contact with disengagement preventing means 8, as shown in FIG. 4. Where the engaging member 3 is set free from a hold by finger, it is pushed against by the bias force of the compression coil spring 10 to cause the disengagement preventing portion 8 to be separated from the groove 7, and therefore the battery case 2 may be easily taken out by hand.

The battery case 2 may be enough to be only pushed to house it into the concave 5. In other words, pushing the battery case 2 in the concave 5 causes the projected engaging portion 6 to be brought into contact with the engaging portion 9, and the engaging member 3 is moved against the bias force the compression coil spring 10 due to the inclined planes formed on the respective contact portions, thereby permitting the projected engaging portion 6 to be passed. Under this condition, the battery case 2 is thoroughly pushed against the bias force of the leaf spring 11 till the flange portions 2a come into contact with the main body 1, and then the engaging member 3 is disengaged from the projected engaging portion 6 to return to the position of FIG. 2, thereby engaging and holding the battery case 2 in the concave 5.

Therefore, according to the above-mentioned embodiment, where the battery case 2 is taken out, the disengagement preventing portion 8 of the engaging member 3 comes into the groove 7 at almost the same time when the engagement between the engaging portion 9 of the engaging member 3 and the projected engaging portion 6 formed in the battery case 2 is released, and the end of the groove 7 bumps against and comes into contact with the disengagement preventing portion 8, thereby preventing the battery case 2 from falling. Accordingly, the bias force of the leaf spring 11 can be strengthened, thereby enabling the battery case 2 to be taken out without failure.

According to the above-mentioned embodiment, the engaging means for engaging and holding the battery case 2 in the concave 5 includes the engaging portion 9 formed on the engaging member 3 and the projected engaging portion 6 formed on the battery case 2. In addition, the disengagement preventing means for engaging and holding temporarily the battery case 2 at a position on its way of disengagement includes the disengagement preventing portion 8 formed on the engaging member 3 and the groove 7 formed on the outer surface of the battery case 2. This invention, however, is not limited to this embodiment.

Figure 5:
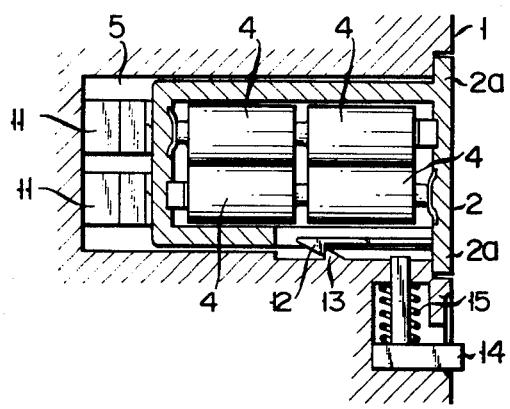
FIG. 5 is a transverse cross sectional view of a second embodiment of the invention, where the battery case is located at the engagement position.
Figure 6:
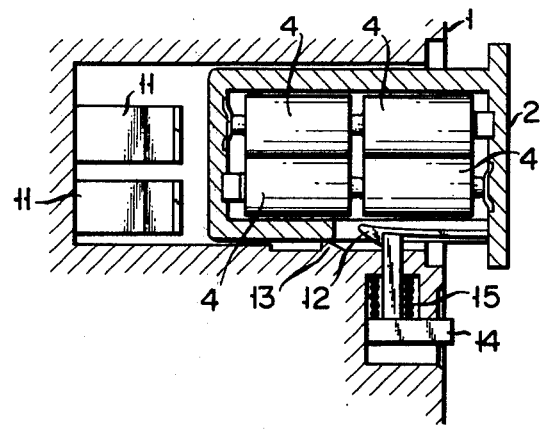
FIG. 6 is a transverse cross sectional view similar to FIG. 5, where the battery case is at a position on its way of disengagement.

There will be described a second embodiment according this invention in FIGS. 5 to 6. The embodiment is different from the above first embodiment in the engaging means and the disengagement preventing means. That is, the engaging means includes an engaging pawl 12 attached on the battery case 2 and a projected engaging portion 13 protrudingly formed on the inner surface of the concave 5. Engagement of the engaging means is released by a release member 14 of which one end is projected outside the main body 1. On the other hand, the disengagement preventing means includes the aforesaid engaging pawl 12 and release member 14. The engaging pawl 12 has elasticity and is placed at a position where it usually engages the projected engaging portion 13 to keep the battery case 2 held in the concave 5. The engaging pawl 12 is pushed by the top end of the release member 14 and disengaged from the projected engaging portion 13, when the release member 14 is moved by manual operation against the bias force of the spring 15. With the disengagement of the engaging pawl 12 from the projected engaging portion 13, the battery case 2 is sprung outwardly by the bias force of the leaf spring 11, but temporarily enaged and held at a position on its way of disengagement as shown in FIG. 6, because the engaging pawl 12 is engaged with the top end of the release member 14 kept in the position shifted in the anti-bias direction. Further, the release member 14 is disengaged from the engaging pawl 12 and returned, when it be released from a hold by finger, to the original position by means of the bias force of the compression coil spring 15, thereby enabling the battery case 2 to be easily taken out in that condition.

Consequently, this embodiment can also obtain the same effect as that obtained by the first embodiment.

Figure 7:
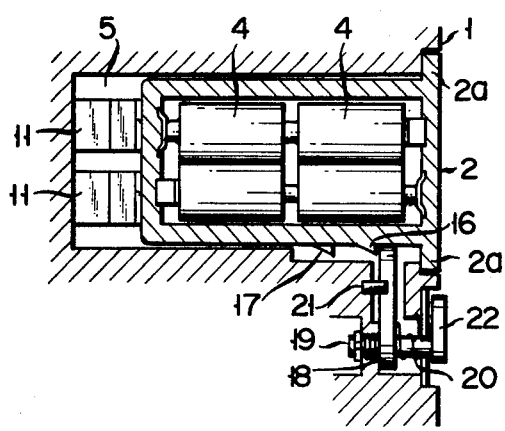
FIG. 7 is a transverse cross sectional view of a third embodiment of the invention.
Figure 8:
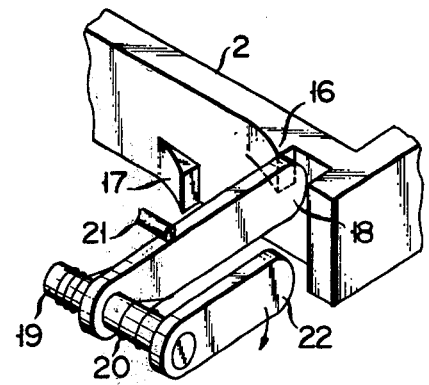
FIG. 8 is a partially broken perspective view of the third embodiment.
Figure 9:
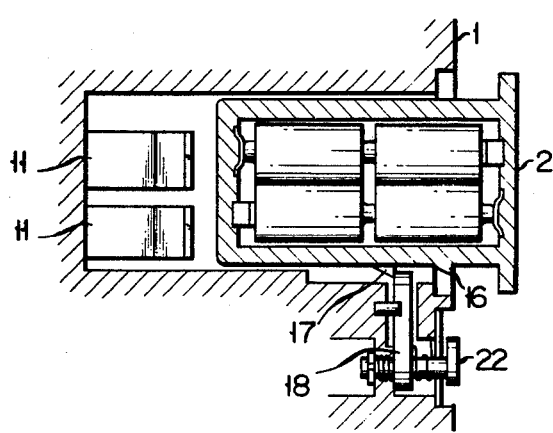
FIG. 9 is a transverse cross sectional view similar to FIG. 7, where the battery case is at a position on its way of disengagement.

FIGS. 7 to 9 show a still another embodiment. Two projected engaging portions 16, 17 are formed on the outer surface of the battery case 2, and also an engaging arm 18 is rotatably mounted on the main body 1. One projected engaging portion 16 and the engaging arm 18 are constituted the engaging means, and the other projected engaging portion 17 and the engaging arm 18 are constituted the disengagement preventing means.

The projected engaging portions 16, 17, as shown in FIG. 8, are formed in a zig-zag way, that is, separately formed in the positions displaced from each other longitudinally and transversely of the battery case 2. The projected engaging portion 16 is formed in the position outer and upper than that of the other projected engaging portion 17. The engaging arm 18 is fixed to a rotating shaft 19 at its one end, being biased upwardly by a torsion spring 20 wound around the rotating shaft 19 and abutted against a stop pin 21. A release lever 22 projected outside from the main body 1 is fixed to the rotating shaft 19. The release lever 22 is manually operated to be rotated in the direction of an arrow.

The engaging arm 18 is also engaged with the projected engaging portion 16 at the position where it is abutted against the stop pin 21, and holds the battery case 2 to be stayed in the concave 5. With the rotation of the release lever 22 against the bias force of the torsion spring 20, the engaging arm 18 is incorporatedly rotated in the direction of the arrow to be disengaged from the projected engaging portion 16. Then, with the disengagement of the engaging arm 18 from the projected engaging portion 16, the battery case 2 is sprung outwardly by the bias force of the bias means 11. However, the other projected engaging portion 17 bumps against and comes into contact with the engaging arm 18, and therefore the battery case 2 is temporarily engaged and held, as shown in FIG. 9, in a position on its way of disengagement. The release lever 22, when released from a hold by finger, is returned to the original position by the bias force of the torsion spring 20, and at the same time the engaging arm 18 is disengaged from the projected engaging portion 17 to return to the upper position, thereby enabling the battery case 2 to be easily taken out in the above condition.

Consequently, in this embodiment also, there can be obtained the same result as that obtained in the embodiments as mentioned previously.

As described hereinbefore, the battery case holding mechanism according to this invention comprises an engaging means for engaging and holding a battery case in a concave formed in a main body of an electric apparatus, a bias means for urging the battery case outward form the concave and a disengagement preventing means for engaging and holding temporarily the battery case in a position on its way of disengagement in the interlocking relation with the engagement releasing operation of the engaging means. The battery case is thereby prevented from springing out of the concave at the same time when the engaging means is operated to be released from the engagement. Even if the opening of the concave is turned downward, the battery case is prevented from falling.

What is claimed is:

1. A battery case holding mechanism comprising:
   a bias means for biasing a battery case in a direction in which the battery case is disengaged, which is detachably received in a concave formed in a main body of an electric apparatus;
   an engaging means capable of engaging and holding the battery case in a concave and of being released from the engagement by manual operation; and
   a disengagement preventing means which is actuated in interlocking relation with the engagement releasing operation of the engaging means and which engages temporarily the battery case in a position on its way of disengagement.

2. The battery case holding mechanism according to claim 1, wherein the engaging means and disengagement preventing means each include a pair of engaging members; a first engaging member of the engaging means is biased by spring force or resilience to the position in which it is engaged with a second engaging member of the engaging means; and the first engaging member is engaged as a first engaging member of the disengagement preventing means with a second engaging member of the disengagement preventing means, in so almost as the same time when the first engaging member of the engaging means is separated from the engagement position against the spring force or resilience.

3. The battery case holding mechanism according to claim 2, wherein one or both of two second engaging members are formed on each or one lateral side of the battery case.

4. The battery case holding mechanism according to claim 3, wherein the second engaging member of the engaging means is a projected engaging portion formed on one lateral side of the battery case; the second engaging member of the disengagement preventing means is a groove formed on the other lateral side of the battery case; and the first engaging member of the biasing means is urged by the bias force of a coil spring.

5. The battery case holding mechanism according to claim 3, wherein two second engaging members are both the projected engaging portions formed separately from each other in a zig-zag way on the same lateral side of the battery case; and the first engaging member of the engaging means is a rotatable engaging lever biased by the bias force of the torsion spring.

6. The battery case holding mechanism according to claim 2, wherein the second engaging member of the engaging means is a projected engaging portion formed in the main body of the electric apparatus and extending to the concave; the first engaging member of the engaging means is an elastic engaging pawl; and the second engaging member of the disengagement preventing means is a member by which the engaging pawl is engaged at almost the same time when the engaging pawl is pushed against the resilience of itself to be released from the engagement with the projected engaging portion.

* * * * *